UNITED STATES PATENT OFFICE 2,325,391

METHOD OF PREPARING ORGANIC THIONITRITES

Richard S. George, State College, Pa., and George S. Crandall and Edwin M. Nygaard, Woodbury, N. J., assignors to Socony-Vacuum Oil Company, Incorporated, New York, N. Y., a corporation of New York No Drawing. Application June 4, 1940, Serial No. 338,736

7 Claims. (Cl. 260—453)

This invention relates to the treatment of hydrocarbon fuel oils of the character used in compression ignition or Diesel engines so as to improve the ignition quality of the fuel. One object of this invention is to provide a Diesel fuel oil blend in which the ignition lag or ignition delay period of the fuel when used in a Diesel engine is substantially decreased, thereby improving the operating efficiency of the engine.

The present invention is more particularly concerned with a Diesel fuel oil in which the ignition quality has been improved by the incorporation therein of an organic thionitrite. We are aware of the fact that organic thionitrites have heretofore been proposed for use as improving agents for Diesel fuels, and our invention is especially concerned with an improved method for preparing the organic thionitrite and the Diesel fuel blend containing same. United States Patent No. 2,169,186 discloses the idea of employing organic thionitrites as Diesel fuel improving agents. The thionitrites obtained according to the disclosure of that patent are prepared by the reaction of a mercaptan with nitrosyl chloride. This reaction is represented in the patent by the following equation:

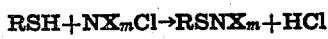

in which R is said to represent an alkyl or aryl group; X is sulfur and/or oxygen; and $m$ is a whole number having a value not greater than 2. When X is oxygen and $m$ is 1, the second reactant is nitrosyl chloride. We have discovered that when the thionitrite is prepared according to the procedure described in this patent, it is of relatively low stability; and although it does possess the property of decreasing the ignition delay period, as indicated by the cetane number of a Diesel fuel, such decrease is not of the high order obtained by thionitrites prepared according to the procedure of the present invention. The instability of these thionitrites, which may account for their low degree of effectiveness, is possibly explained by the fact that nitrosyl chloride and hydrochloric acid, both of which are present in the reaction mixture and are difficult of removal, act to accelerate the decomposition of the thionitrite.

The method of the present invention lends itself to production of Diesel fuels containing organic thionitrites which have high ignition quality and wherein the thionitrite content is of a high degree of stability. It possesses the further advantage of providing means whereby the thionitrite can be manufactured in commercial quantities from readily available raw materials without excessive loss of materials and without complicated processing. Although the invention is primarily concerned with the production of improved Diesel fuels, the method for forming the thionitrite lends itself to the recovery of this product in the pure state. Our invention, therefore, contemplates both the method in which the thionitrite is finally obtained in a Diesel fuel oil blend and in which the pure product is recovered.

The method contemplated herein may be broadly described as comprising the interreaction of a thiol compound with an alkali nitrite and a mineral acid in a non-homogeneous liquid system comprising an aqueous phase and a non-aqueous phase, which latter phase is a solvent for the thionitrite corresponding to the thiol compound and possesses the further property of substantial immiscibility with water.

In the event the ultimate product is to be a Diesel fuel blend, the non-aqueous phase of the liquid system above referred to should possess the further property of miscibility with the fuel oil—that is, it should be capable of being blended with a fuel suitable for compression ignition engines without serious loss of ignition quality of the blended fuel as compared with the unblended fuel. This non-aqueous phase should, of course, be a material having a low degree of reactivity toward the reagents used and should be inert toward the thionitrite formed as the reaction product. Examples of solvents which may be successfully used in the process contemplated herein are petroleum fractions such as Diesel fuel oil and Stoddard solvent, alcohols such as fusel oil having low solubility in water, and organic ethers.

The thiol compounds which may be used in the process of this invention are those compounds characterized by the presence of the thiol (SH) group or their metal derivatives characterized by the presence of the SM group. Examples of such compounds are the alkyl mercaptans, thiophenols, thiolic acids and thionothiolic acids and their metal derivatives, which compounds may be typified by the general formulae: RSH, RSM, RCXSH and RCXSM, in which R represents alkyl, alkaryl, aralkyl, and aryl; X represents oxygen or sulfur; and M represents a metal, preferably an alkali metal.

The reactions involved in the method contemplated herein with the various typical thiol compounds referred to are illustrated by the following equations:

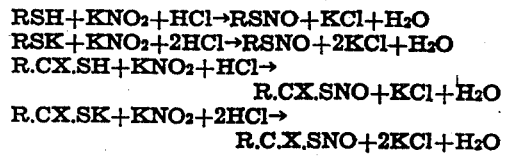

in which potassium nitrite and hydrochloric acid are employed as the illustrative secondary reactants.

Although alkali nitrites are specifically referred to hereinabove, it will be understood that any inorganic nitrite may be employed with any mineral acid which will react to release nitrous acid and form the water-soluble salt of the inorganic acid. For use as the mineral acid in this reaction preference is given to HCl and $H_2SO_4$. The nitrous acid released reacts with the SH group of the thiol compound to form the thionitrite. If the metal derivative of the thiol compound is employed, it is necessary to use a sufficient quantity of mineral acid to convert the SM group to the SH group for reaction with the nitrous acid.

The general procedure in carrying out the process involves forming the non-homogeneous liquid system of the type hereinabove referred to, which system contains the inorganic nitrite and the thiol compound. The system is then vigorously agitated to bring the two phases into intimate contact, and the mineral acid is slowly added thereto. The thionitrite as it is formed goes into the non-aqueous phase of the system; and after the reaction is complete, the non-aqueous solution containing the thionitrite may be separated and either added to a Diesel fuel oil or further treated to recover the pure thionitrite.

Since many of the thionitrites are relatively unstable, it is desirable to carry out the reaction at relatively low temperature, although for some compounds such as the tertiary butyl thionitrite the reaction may be carried out at room temperature. In general, however, it is preferable to employ temperatures ranging from $-20$ to $+20°$ C., depending upon the stability of the product. The quantity of the alkali nitrite used should be slightly in excess of that required to convert the mercaptan to the thionitrie; and, as indicated above, the quantity of mineral acid used should be substantially equivalent to the alkali nitrite in case a mercaptan is used as the thiol reactant and should be equivalent to the mercaptide and the nitrite in case a mercaptide or metal derivative of the thiol compound is used.

The general procedure described above may be carried out by forming a solution of a mercaptan or other thiol compound in fusel oil, or other suitable solvent meeting the aforesaid requirements, of such a concentration as will yield an approximately 20 per cent blend of the thionitrite, assuming a quantitative conversion. This non-aqueous solution is then mixed with a water solution of sodium nitrite in a quantity slightly in excess of that required to convert the thiol compound to the thionitrite. The mixture is then preferably cooled to a temperature at which the thionitrite product will have a relatively high degree of stability. In general this temperature is within the range of $-20°$ to $+20°$ C. After the reaction mixture has been cooled, concentrated hydrochloric acid, in molecular equivalent quantity to the thiol compound, with about 1½ times its weight of ice is added, with stirring and continued cooling, at such a rate that the temperature of the reaction mixture does not rise appreciably. After the acid has been added, the reaction mixture is agitated at the reduced temperature for a sufficient period of time, generally from ½ hour to 1 hour, to complete the reaction. Completion of the reaction is indicated by disappearance of the odor of the thiol compound.

Instead of adding the thiol compound in solution in the non-aqueous solvent, it may be added to the aqueous phase as an alkaline solution of the thiol compound, in which case, as aforesaid, a sufficient quantity of acid must be added to liberate the thiol compound as well as the nitrous acid necessary for the reaction. This latter modification of the procedure is of particular applicability to the utilization of the mercaptans removed from petroleum products by caustic washing.

After the reaction is complete, the two phases are permitted to separate, separation of the phases being facilitated by the addition of solid sodium chloride. The non-aqueous phase containing the organic thionitrite is separated from the aqueous phase, and, after filtration through a clarifying medium such as paper or glass wool, it is ready for blending with the Diesel fuel oil. In preparing blends from solutions of the type obtained according to the foregoing general procedure, the proportions are calculated on the assumption of 100 per cent conversion of the thiol compound to the thionitrite. In the event it is desired to isolate the thionitrite, this is preferably accomplished by using ether as the organic solvent. The ether solution of thionitrite may be concentrated and distilled at reduced pressure in one operation to obtain the thionitrite as a final product.

Further details in the procedure contemplated herein are illustrated by the following specific example, which describes the preparation of tertiary butyl thionitrite in solution in a Diesel fuel oil.

*Example*

Two kilograms of a straight run No. 2 Diesel fuel were placed in a three-necked, three-liter flask fitted with a mechanical stirrer, thermometer, and dropping funnel. The flask was immersed in a dry-ice cooling bath and chilled to approximately $-5°$ C. to $0°$ C. To the chilled oil was added a solution of 26 grams (0.36 mole) of 96–98% sodium nitrite dissolved in 100 cc. of water. Then 30 grams (0.33 mole) of tertiary butyl mercaptan was added to the well-stirred mixture. While the temperature was maintained between $-5$ and $+3°$ C., 40 grams (0.38 mole) of concentrated hydrochloric acid mixed with 100 grams of ice was slowly added at such a rate that the temperature did not rise appreciably. Almost immediately on the addition of the acid the typical red-green dichroism of tertiary butyl thionitrite became evident. After addition of the acid the mixture was stirred for one-half hour at approximately $0°$ C. The oil-water mixture was then filtered through glass wool, the aqueous layer drawn off and the oil layer filtered through paper.

To demonstrate the effectiveness of Diesel fuels containing organic thionitrites prepared according to the procedure contemplated herein we have conducted a series of tests with Diesel fuel blends containing typical organic thionitrites. In these tests the ignition quality of the Diesel fuel blends was determined by the ignition delay method in a converted C. F. R. engine, the results thereof being expressed as cetane numbers (C. N.). The cetane number is the per cent by volume of cetane in a blend of cetane and alpha methyl naphthalene, which blended fuel has the same combustion characteristics as the sample being tested (see Proc. A. S. T. M., vol. 38, I, page 392). The fuel used in obtaining the results which are tabulated in Table I below was a straight run No. 2 Diesel fuel oil distillate from Oklahoma City crude having a cetane number of 52. The results set forth in Table I were obtained with thionitrites prepared according to the procedure of the invention. The blank fuel in the samples indicated by (a) and (b) contained no other agent than the Diesel fuel blend prepared according to the procedure described in the example above. The blank fuel in samples (c) to (h) inclusive contained as a stabilizer for the thionitrite a quantity of fusel oil equal to from 2 to 2½ times the concentration of the thionitrite used in the sample. The fusel oil was employed solely for the purpose of stabilization, as disclosed in copending application Serial No. 338,737, filed June 4, 1940, and made no contribution to the cetane number of the blend.

Table I

| Thiol compound from which thionitrite was prepared | Conc., per cent by wt. | C. N. of blank | C. N. of blend | Increase in C. N. |
|---|---|---|---|---|
| (a) Tertiary butyl mercaptan | 2.0 | 52.0 | ¹ 65.5+ | 13.5+ |
| Do | 1.0 | 52.0 | 65.5 | 13.5 |
| Do | 0.5 | 52.0 | 65.5 | 13.5 |
| Do | 0.25 | 52.0 | 59.0 | 7.0 |
| (b) Mixed amyl mercaptan ² | 1.0 | 52.0 | 62.0 | 10.0 |
| Do | 0.25 | 52.0 | 59.0 | 7.0 |
| (c) Crude ethyl mercaptan ³ | 1.0 | 52.0 | 65.5 | 13.5 |
| Do | 0.5 | 52.0 | 61.0 | 9.0 |
| (d) Benzyl mercaptan | 1.0 | 52.0 | 65.0 | 13.0 |
| (e) Pentamethylene dimercaptan | 1.0 | 52.0 | 64.0 | 12.0 |
| (f) p-Tolyl mercaptan | 1.0 | 52.0 | ¹ 65.5+ | 13.5+ |
| (g) Thiopropionic acid | 1.0 | 52.0 | 65.5 | 13.5 |
| (h) Thiobenzoic acid | 1.0 | 52.0 | 58.0 | 6.0 |

¹ Blends reported as having cetane number of 65.5+ have an actual ignition quality of better than 65.5 cetane number; the actual cetane number could not be determined under the conditions of the test.
² The "mixed amyl mercaptan" used in preparing these samples was a mixture of various isomers obtained in the open market.
³ The "crude ethyl mercaptan" was a mixture of mercaptans obtained from petroleum.

To demonstrate the superiority of the organic thionitrites prepared according to the procedure of this invention over organic thionitrites obtained according to the process disclosed in the aforesaid Patent No. 2,169,186, samples of thionitrites were obtained by the reaction with nitrosyl chloride of tertiary butyl mercaptan and mixed amyl mercaptans for comparison with the samples (a) and (b) of Table I above. In preparing these samples the mercaptan was dissolved in a straight run Diesel fuel oil and gaseous nitrosyl chloride was added slowly with stirring. The amount of nitrosyl chloride added was about 20 per cent in excess of the theoretical quantity to convert the mercaptan according to the reaction described in the patent, and the reaction mixture was held at a temperature of about 0° C. during the reaction. The resulting solution of thionitrite in the fuel oil after filtering to remove the small quantity of sludge formed was employed in preparing the blends set forth in Table II below. It will be observed that with equal amounts of the thionitrites obtained according to the procedure of the patent the increase in cetane number was less than half that obtained with thionitrites prepared according to the procedure of the present application.

Table II

| Thiol compound from which thionitrite was prepared | Conc. by wt. | C. N. of blank | C. N. of blend | Increase in C. N. |
|---|---|---|---|---|
| Tertiary butyl mercaptan | 2.0 | 52.0 | 54.0 | 2.0 |
| Do | 1.0 | 52.0 | 58.0 | 6.0 |
| Mixed amyl mercaptans | 1.0 | 52.0 | 54.0 | 2.0 |
| Do | 0.5 | 52.0 | 58.0 | 6.0 |

In the foregoing tables the concentration of the thionitrite in the Diesel fuel was calculated from the amount of thiol compound employed in the reaction on the assumption of 100 per cent conversion to the thionitrite. In this latter regard it is to be understood that the quantity of thionitrite used may be varied depending upon the type of fuel with which it is blended and the ignition properties desired in the blend. The thionitrites prepared according to the method of the present invention may be used in amounts varying from 0.1 per cent to 10.0 per cent, but for most purposes and for most fuels concentrations in the neighborhood of 0.25 per cent to 5.0 per cent will give the desired results.

In the foregoing specification and in the following claims the term "Diesel fuel oil" is intended to be inclusive of any and all types of fuels intended for use in any engine operating according to the Diesel cycle.

We claim:

1. The method of preparing for use in Diesel fuel oil an organic thionitrite solution which includes: interreacting an organic thiol compound, an alkali nitrite, and a mineral acid in a non-homogeneous liquid system comprised of an aqueous phase and a non-aqueous phase, said non-aqueous phase being a solvent for the thionitrite corresponding to said thiol compound and possessing the additional properties of substantial immiscibility with water and substantial miscibility with a Diesel fuel oil; maintaining the temperature below that at which said thionitrite is unstable; and separating the non-aqueous phase containing the thionitrite formed from the aqueous phase.

2. The method of making an organic thionitrite solution which includes: interreacting an organic thiol compound, an alkali nitrite, and a mineral acid in a non-homogeneous liquid system comprised of an aqueous phase and a non-aqueous phase, said non-aqueous phase being a solvent for the thionitrite corresponding to the thiol compound and being substantially immiscible with water; maintaining the temperature below that at which said thionitrite is unstable; and separating the aqueous phase from the thionitrite solution.

3. The method of making an organic thionitrite solution which includes: interreacting an organic thiol compound, an alkali nitrite and hydrochloric acid in a non-homogeneous liquid system comprised of an aqueous phase and a non-aqueous phase, said non-aqueous phase being a solvent for the thionitrite corresponding to the thiol compound and being substantially immiscible with water; maintaining the temperature below that at which said thionitrite is unstable; and separating the aqueous phase from the thionitrite solution.

4. The method of preparing an organic thionitrite solution which includes: adding an organic thiol compound and an inorganic nitrite to a non-homogeneous liquid system comprising an aqueous phase and a non-aqueous solvent for the thionitrite which is substantially immiscible with water; adding to the reaction mixture a mineral acid which will react with the inorganic nitrite to form nitrous acid; agitating the mixture so as to bring about reaction of the nitrous acid with the thiol compound, thereby forming the thionitrite; maintaining the temperature of the mixture throughout the preparation below that at which any substantial decomposition of thionitrite will take place; and separating the non-aqueous phase containing the thionitrite from the aqueous phase.

5. The method of preparing an organic thionitrite solution which includes: adding a mercaptan and an inorganic nitrite to a non-homogeneous liquid system comprising an aqueous phase and a non-aqueous solvent for the thionitrite corresponding to the mercaptan, said non-aqueous solvent being substantially immiscible with water; adding to the reaction mixture a mineral acid which will react with the inorganic nitrite to form nitrous acid; agitating the mixture so as to bring about reaction of the nitrous acid with the mercaptan, thereby forming the thionitrite; maintaining the temperature of the mixture throughout the preparation below that at which any substantial decomposition of thionitrite will take place; and separating the non-aqueous solvent containing the thionitrite from the aqueous phase.

6. The method of preparing an organic thionitrite solution which includes: adding a mercaptide and an inorganic nitrite to a non-homogeneous liquid system comprising an aqueous phase and a non-aqueous solvent for the thionitrite corresponding to the mercaptide, said non-aqueous solvent being substantially immiscible with water; adding to the reaction mixture a mineral acid which will react with the inorganic nitrite and the mercaptide to form nitrous acid and mercaptan, respectively; agitating the mixture to bring about reaction of the nitrous acid and mercaptan to form the thionitrite; maintaining the temperature of the mixture throughout the preparation below that at which any substantial decomposition of thionitrite will take place; and separating the non-aqueous solvent containing the thionitrite from the aqueous phase.

7. The method of preparing an organic thionitrite solution which includes: interreacting an organic thiol compound, an alkali nitrite, and a mineral acid in a non-homogeneous liquid system comprising an aqueous phase and a non-aqueous phase consisting of a hydrocarbon fuel oil; maintaining the temperature throughout the preparation below that at which the thionitrite is unstable; and separating the hydrocarbon fuel oil containing the thionitrite formed by the interreaction of said reagents from the aqueous phase.

RICHARD S. GEORGE.
GEORGE S. CRANDALL.
EDWIN M. NYGAARD.